United States Patent
Guven et al.

(10) Patent No.: US 10,747,300 B2
(45) Date of Patent: Aug. 18, 2020

(54) DYNAMIC CONTENT GENERATION FOR AUGMENTED REALITY ASSISTED TECHNOLOGY SUPPORT

(71) Applicant: International Business Machines Corporation, Armonk, NY (US)

(72) Inventors: Sinem Guven, New York, NY (US); John A. Bivens, Ossining, NY (US); Rohan R. Arora, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 132 days.

(21) Appl. No.: 15/679,574

(22) Filed: Aug. 17, 2017

(65) Prior Publication Data

US 2019/0056779 A1 Feb. 21, 2019

(51) Int. Cl.
| | |
|---|---|
| *G06F 3/01* | (2006.01) |
| *G06T 19/00* | (2011.01) |
| *G06T 17/10* | (2006.01) |
| *G06K 9/00* | (2006.01) |
| *G06F 16/957* | (2019.01) |

(52) U.S. Cl.
CPC .......... *G06F 3/011* (2013.01); *G06F 16/9574* (2019.01); *G06K 9/00214* (2013.01); *G06T 17/10* (2013.01); *G06T 19/006* (2013.01); *G06K 9/00671* (2013.01); *G06K 2209/40* (2013.01); *G06T 2210/56* (2013.01); *G06T 2219/004* (2013.01)

(58) Field of Classification Search
CPC .............. G06F 3/011; G06K 9/00671; G06K 9/00214; G06T 19/006; G06T 17/10
See application file for complete search history.

(56) References Cited

U.S. PATENT DOCUMENTS

| | | | |
|---|---|---|---|
| 6,519,568 B1 | 2/2003 | Harvey et al. | |
| 8,666,921 B2 | 3/2014 | Fisher, Jr. | |
| 8,886,558 B2 | 11/2014 | Alyamour et al. | |
| 8,972,461 B2 | 3/2015 | Lewin et al. | |
| 9,020,824 B1 | 4/2015 | Govil | |
| 9,479,408 B2 | 10/2016 | He et al. | |
| 2012/0293506 A1* | 11/2012 | Vertucci | G06F 3/012 345/419 |

(Continued)

OTHER PUBLICATIONS

Engelke et al., "Content First—A concept for Industrial Augmented Reality Maintenance Applications using Mobile Devices", MMSys '15, Mar. 18-20, 2015, Portland, OR, USA, Copyright 2015 ACM 978-1-4503-3351-1/15/03, 7 pages.

(Continued)

*Primary Examiner* — Ajay M Bhatia
*Assistant Examiner* — Mong-Shune Chung
(74) *Attorney, Agent, or Firm* — Joseph P. Curcuru; Gilbert Harmon, Jr.

(57) ABSTRACT

Embodiments of the present invention provide methods for generating an augmented reality experience based on Knowledge Media. One method can include receiving one or more Knowledge Media. Transforming the one or more Knowledge Media into consumable steps. Extracting hardware information from the one or more Knowledge Media. Generating a three-dimensional point cloud model of the hardware based on the one or more Knowledge Media, and outputting an augmented reality experience based on an annotated three-dimensional point cloud model.

20 Claims, 3 Drawing Sheets

(56) References Cited

U.S. PATENT DOCUMENTS

| | | |
|---|---|---|
| 2013/0330705 A1 | 12/2013 | Grimaud et al. |
| 2014/0310595 A1 | 10/2014 | Acharya et al. |
| 2015/0146007 A1* | 5/2015 | Dusik ................ G06K 9/00671 |
| | | 348/161 |
| 2016/0034761 A1* | 2/2016 | Frankel .................. G09G 5/003 |
| | | 345/633 |
| 2016/0140868 A1 | 5/2016 | Lovett et al. |
| 2018/0253900 A1* | 9/2018 | Finding ................ G06T 19/006 |

OTHER PUBLICATIONS

Zhu et al., "AR-Mentor: Augmented Reality Based Mentoring System", 2014 IEEE International Symposium on Mixed and Augmented Reality (ISMAR), Year: 2014, pp. 17-22, DOI: 10.1109/ISMAR.2014.6948404.

* cited by examiner

DYNAMIC CONTENT GENERATION FOR AUGMENTED REALITY ASSISTED TECHNOLOGY SUPPORT

BACKGROUND OF THE INVENTION

The present invention relates generally to the field of dynamic content composition, and more particularly to dynamic composition for augmented reality assisted technology support.

Today, in the technology support setting, there is no way of automatically converting Knowledge Media (KM) to augmented reality (AR) experiences. Contents authors manually copy/paste the KM instructions and relate them to a three-dimensional (3D) model parts. The current approach is not scalable due to the effort required, as KM get updated, and increasingly new hardware is being added to the inventory. Any AR technology support system, whether it uses real-time or offline authored content, would benefit from automated conversion of KM into AR experiences.

Furthermore, in today's AR systems, a majority of the content displayed is pre-determined. In a technical support setting, given the rich set of problems, and associated solutions, there is abundance of pre-determined content (such as Knowledge Media that show step-by-step instructions for how to repair a problem). An important requirement with such documents is automated-ingestion to make them consumable by AR systems. However, even if AR content were automatically generated from existing documents, their static nature imposes a major restriction to their usefulness. If a relatively novice field technician strays away from the instructions either because they miss a step, or make a mistake, there is no alternative path that is provided other than contacting remote support for assistance.

SUMMARY

Embodiments of the present invention disclose a method, a computer program product, and a system for generating an augmented reality experience based on Knowledge Media. One method can include receiving, by one or more processors, one or more Knowledge Media. Transforming, by the one or more processors, the one or more Knowledge Media into consumable steps. Extracting, by the one or more processors, hardware information from the one or more Knowledge Media. Generating, by the one or more processors, a three-dimensional point cloud model of the hardware based on the one or more Knowledge Media, and outputting, by the one or more processors, an augmented reality experience based on an annotated three-dimensional point cloud model.

According to an embodiment of the present invention, a computer program product for generating an augmented reality experience based on Knowledge Media, the computer program product can include one or more computer readable storage devices and program instructions stored on the one or more computer readable storage devices, the stored program instructions can include program instructions to receive one or more Knowledge Media. Program instructions to transform the one or more Knowledge Media into consumable steps. Program instructions to extract hardware information from the one or more Knowledge Media. Program instructions to generate a three-dimensional point cloud model of the hardware based on the one or more knowledge media, and program instructions to output an augmented reality experience based on an annotated three-dimensional point cloud model.

According to another embodiment of the present invention, a computer system for generating an augmented reality experience based on Knowledge Media, the computer system can include: one or more computer processors, one or more computer readable storage devices, program instructions stored on the one or more computer readable storage devices for execution by at least one of the one or more computer processors, the stored program instructions can include program instructions to receive one or more Knowledge Media. Program instructions to transform the one or more Knowledge Media into consumable steps. Program instructions to extract hardware information from the one or more Knowledge Media. Program instructions to generate a three-dimensional point cloud model of the hardware based on the one or more Knowledge Media, and program instructions to output an augmented reality experience based on an annotated three-dimensional point cloud model.

DETAILED DESCRIPTION

Embodiments of the present invention enable an automated augmented reality (AR) experience composition methodology based on cognitive capabilities (e.g., video recognition, concept mining and extraction, 3D element identification and association). Additionally, embodiments of the present invention can learn over time what level of complexity should be used to assemble the right/appropriate content that is consumable by the user. Embodiments of the present invention comprise multiple components that enable content ingestion, construction of a directed series of instructions that represent repair steps, linking the repair steps to relevant hardware pieces and/or associated error codes and dynamic content composition based on altering the series of instructions in real-time as needed. Accordingly, these embodiments improve the art of AR.

Implementation of embodiments of the invention may take a variety of forms, and exemplary implementation details are discussed subsequently with reference to the Figures.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It can also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations can be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Figure 1:
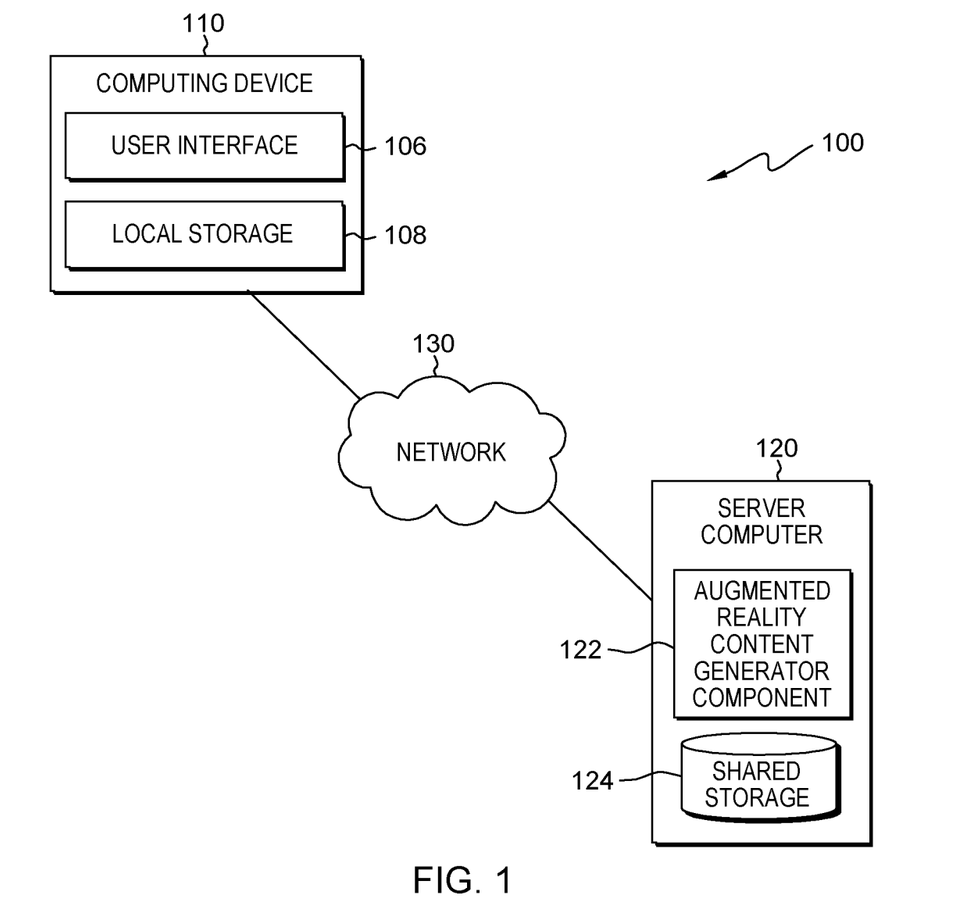
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110, server computer 120, interconnected over network 130. Network 130 can be, for example, a telecommunications network, a local area network (LAN), a wide area network (WAN), such as the Internet, or a combination of the three, and can include wired, wireless, or fiber optic connections. Network 130 can include one or more wired and/or wireless networks that are capable of receiving and transmitting data, voice, and/or video signals, including multimedia signals that include voice, data, and video information. In general, network 130 can be any combination of connections and protocols that will support communications between computing device 110 and server computer 120, and other computing devices (not shown in FIG. 1) within distributed data processing environment 100.

In various embodiments, computing device 110 can be, but is not limited to, a standalone device, a server, a laptop computer, a tablet computer, a netbook computer, a personal computer (PC), a smart phone, a desktop computer, a smart television, a smart watch, any programmable electronic computing device capable of communicating with various components and devices within distributed data processing environment 100, via network 102 or any combination therein. In general, computing device 110 are representative of any programmable mobile device or a combination of programmable mobile devices capable of executing machine-readable program instructions and communicating with users of other mobile devices via network 130 and/or capable of executing machine-readable program instructions and communicating with server computer 120. In other embodiments, computing device 110 can represent any programmable electronic computing device or combination of programmable electronic computing devices capable of executing machine readable program instructions, manipulating executable machine readable instructions, and communicating with server computer 120 and other computing devices (not shown) within distributed data processing environment 100 via a network, such as network 130. Computing device 110 includes an instance of user interface 106. Computing device 110 and user interface 106 allow a user to interact with augmented reality content generator component 122 in various ways, such as sending program instructions, receiving messages, sending data, inputting data, editing data, correcting data and/or receiving data.

User interface (UI) 106 provides an interface to augmented reality content generator component 122 on server computer 120 for a user of computing device 110. In one embodiment, UI 106 can be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, UI 106 can also be mobile application software that provides an interface between a user of computing device 110 and server computer 120. Mobile application software, or an "app," is a computer program designed to run on smart phones, tablet computers and other mobile devices. In an embodiment, UI 106 enables the user of computing device 110 to send data, input data, edit data, correct data and/or receive data. In various embodiments, UI 106 can enable the user to upload/enter Knowledge Media (KM) to augmented reality content generator component 122 for ingestion.

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any other programmable electronic device capable of communicating with computing device 110 and other computing devices (not shown) within distributed data processing environment 100 via network 130. In another embodiment, server computer 120 represents a computing system utilizing clustered computers and components (e.g., database server computers, application server computers, etc.) that act as a single pool of seamless resources when accessed within distributed data processing environment 100. Server computer 120 can include augmented reality content generator component 122 and shared storage 124. Server computer 120 can include internal and external hardware components, as depicted, and described in further detail with respect to FIG. 3.

Shared storage 124 and local storage 108 can be a data repository and/or a database that can be written to and/or read by one or a combination of augmented reality content generator component 122, server computer 120 and/or computing devices 110. In the depicted embodiment, shared storage 124 resides on server computer 120. In another embodiment, shared storage 124 can reside elsewhere within distributed data processing environment 100 provided coverage assessment program 110 has access to shared storage 124. A database is an organized collection of data. Shared storage 124 and/or local storage 108 can be implemented with any type of storage device capable of storing data and configuration files that can be accessed and utilized by server computer 120, such as a database server, a hard disk drive, or a flash memory. In other embodiments, shared storage 124 and/or local storage can be hard drives, memory cards, computer output to laser disc (cold storage), and/or any form of data storage known in the art. In various embodiments, augmented reality content generator component 122 can store and/or retrieve data from shared storage 124 and local storage 108. For example, augmented reality content generator component 122 stores KM regarding debugging issues to local storage 108, and at a later time augmented reality content generator component 122 can retrieve the KM and use the retrieved KM to solve a current issue. In various embodiments, augmented reality content generator component 122 can have cognitive capabilities and learn from previous files and/or data augmented reality content generator component 122 has interacted with. For example, retrieving and analyze previously generated repair steps to determine the most efficient method of repair.

In the exemplary embodiment, augmented reality content generator component 122 is housed on server computer 120;

however, in other embodiments, augmented reality content generator component 122 can be housed on computing device 110, and/or a computing device and/or server computer not depicted in FIG. 1. In various embodiments, augmented reality content generator component 122 can enable the automated transformation and/or generation of KM and/or video generated point clouds into one or more automated augmented reality (AR) experiences. KM can be, but are not limited to, static documents, dynamic documents, active documents, live documents, rich text documents, plain text documents, knowledge base, video documents (e.g., training videos and/or tutorial videos), and/or any documents and/or files known in the art. In an exemplary embodiment, augmented reality content generator component 122 transforms KM (e.g., static documents) into consumable steps (e.g., Step 1, Step 2, etc.). It should be noted that "consumable steps" can be associated with, and can be interchangeable with "procedural steps." For example, a user uploads a document describing how to replace a microprocessor in a server, augmented reality content generator component 122 would then transform the document into a consumable list depicted below.

Task: Replace Microprocessor in Server
1. Remove Cover
2. Remove Heat Sink
3. Remove Microprocessor
4. Install Microprocessor
5. Install Heat Sink
6. Replace Cover In some embodiments, each high-level step also has lower level instructions. For example:
1. Remove Cover
2. Remove Heat Sink→2a. Remove screw to the left of Heat Sink→2b. Lift up the latch to allow dismantle of Heat Sink→2c. Pick up and remove Heat Sink
3. Remove Microprocessor
4. Install Microprocessor
5. Install Heat Sink
6. Replace Cover In other embodiments, consumable steps can contain multiple levels of depth, as well as reference of other levels. For example:
1. Remove Cover
2. Remove Heat Sink→2a. Remove screw to the left of Heat Sink→2b. Lift up the latch to allow dismantle of Heat Sink→2b1. Position your index finger tip below the latch and push upwards until the Heat Sink slightly pops out of slot. 2b2. If the latch is stuck due to corrosion, refer to step 18.→2c. Pick up and remove Heat Sink
3. Remove Microprocessor
4. Install Microprocessor
5. Install Heat Sink
6. Replace Cover In various embodiments, consumable steps can contain reasons and associated error codes for performing each action. For example:
1. Remove Cover
2. Remove Heat Sink—2-err-a. Heat Sink faulty (errCode: 51640; 2-err-b. Microprocessor faulty (errCode: 4896); 3-err-c; Fan faulty (errCode:9322)
3. Remove Microprocessor→3-err-a. Heat Sink faulty (errCode: 51640; 4-err-b. Microprocessor faulty (errCode:4896); 5-err-c; Fan faulty (errCode:9322)
4. Install Microprocessor
5. Install Heat Sink
6. Replace Cover Additionally, for one or more steps, augmented reality content generator component 122 can utilize natural language processing (NPL) to extract hardware entities. In various embodiments, augmented reality content generator component 122 can mine and extract one or more received documents (e.g., KM) for information describing hardware entities, and learn about the described hardware entities by storing and retrieving the extracted information. For example, augmented reality content generator component 122 receives a document (e.g., KM) describing how to replace a computer fan, augmented reality content generator component 122 will analyze the received document, extract and save the information relating to the hardware necessary to replace the computer fan and the surrounding hardware. Additionally, in this particular example, given videos (e.g., video tutorial) of the hardware and associated knowledge documents, augmented reality content generator component 122 creates a label/annotation for the recognized hardware/hardware entity. In this particular example, augmented reality content generator component 122 will extract, store, and display the fan's location, the fan's dimensions, the part number, the make and model of the fan and the computer, how many screws are holding the fan in place, where the screws are located, and the location of the power source for the fan. It should be noted that throughout this document, label and annotation can have the same meaning.

Furthermore, in an embodiment, augmented reality content generator component 122, using NPL, can extract one or more part numbers and/or look up one or more part numbers for one or more hardware entities, via a taxonomy. For example, augmented reality content generator component 122 determines that the Power 8 heat sink part number is P0015985. Additionally, in various embodiments, augmented reality content generator component 122 can be trained to recognize hardware entities and their bounds in video, via video recognition. For example, when a user is looking at a computer using augmented reality glasses augmented reality content generator component 122 will state the hardware entities the user is focusing on as the user scans the computer and state "you are looking at a heat sink, microprocessor, and a fan." In a different example, augmented reality content generator component 122 will direct the user to which piece of hardware they need to focus on for a particular step by projecting an arrow over the hardware to indicate its location.

Generally, augmented reality content generator component 122 can learn to recognize various hardware entities automatically through the analysis and/or training of videos (e.g., KM). Additionally, augmented reality content generator component 122 can retrieve, access, and/or utilize past knowledge and/or learning experiences from shared storage 124 and/or local storage 108 to generate one or more augmented reality experiences. In various embodiments, augmented reality content generator component 122 can generate a 3D model point cloud of hardware based on KM. For example, augmented reality content generator component 122 will receive a video explaining how to remove the hard drive from a laptop. In this particular example, augmented reality content generator component 122 will analyze and train itself to automatically recognize the parts associated with removing the aforementioned hard drive (e.g., screens, covers, hard drive, etc.). Additionally, in this particular embodiment, augmented reality content generator component 122 will be trained to visually recognize the parts associated with removing the hard drive and label the parts by placing arrows over the parts as the steps progress, via computing device 110. In various embodiments, augmented reality content generator component 122 will automatically associate learned/trained hardware entities with the consumable steps.

In various embodiments, 3D point cloud segments/chucks can be labelled through parts identified in a video recording of the hardware. For example, identifying and/or associating a heat sink in the video as a group of pixels in the video. In various embodiments, augmented reality content generator component 122 can automatically construct an AR experience by recognizing the hardware entity as seen by AR glasses and/or one or more smart phone cameras, retrieving and displaying the step by step/systematic instruction related to that hardware entity, and displaying 3D annotations (arrows, markers, labels, etc.) on the relevant hardware entities of discussion and/or repair. Annotations can be, but are not limited to, arrows, markers, labels, color, voice, sound, vibration, tunnel vision, text bubbles, and/or pulsing color. For example, if the user is visually impaired augmented reality content generator component 122 can vocally instruct the user where the hardware is located and vibrate and vocally instruct the user when they are touching the wrong hardware entity.

In various embodiments, augmented reality content generator component 122 can generate assembly and repair instructions (e.g., Assembling Repair Instructions). For example, the cognitive AR system (e.g., augmented reality content generator component 122), given a task description (e.g., Replace Microprocessor in Server.), generates consumable steps, fine tunes the consumable steps in real time depending on the user's needs. If more detailed instructions are needed, then augmented reality content generator component 122 can enable dynamic composition of content for repair instructions. In another embodiment, augmented reality content generator component 122 can receive assembling diagnostic instructions, in which augmented reality content generator component 122 can generate consumable steps containing error codes; additionally, augmented reality content generator component 122 can enable diagnostic guidance (unlike known repair problems, diagnostic guidance requires fully dynamic content creation). For example, the hardware error console shows error code 4896 indicating a problem with the microprocessor of the server. From the received KM and/or consumable steps, environment 100 knows that the microprocessor error is related to Heat Sink and Microprocessor (and Fan—not shown here), so augmented reality content generator component 122 retrieves instructions from the potential known parts that need to be inspected for diagnosis of this error.

In other embodiments, augmented reality content generator component 122 can generate and/or enable a 3D polygonal model of the server annotated with the taxonomy of parts. For example, the word fan will appear over a fan when a user looks at it through AR glasses and/or an AR smart phone application. In other embodiments, augmented reality content generator component 122 can label/annotate hardware entities using color, vision focus (e.g., focusing on the hardware entity and blurring the surrounding hardware), and/or sound. In various embodiments, augmented reality content generator component 122 can read out the title and/or names of hardware as a user looks through them. In other embodiments, augmented reality content generator component 122 can display an annotation/label as an arrow pointing at the hardware to indicate which piece of hardware is the current topic of discussion. It should be noted that hardware and/or hardware entities can be any objects presentable via KM and/or displayable in AR.

In various embodiments, augmented reality content generator component 122 can enable real-time content authoring. For example, a remote support technician (RTS) needs to send real-time annotation to a field agent. In this particular example, instructions would be already extracted from the KM and would be in a consumable format (e.g., a list of drag/drop elements). In this particular example, the RTS agent would then drag/drop the relevant instruction into the scene, and the underlying cognitive system would know which hardware item to associate the annotation with and where to display it (e.g., Pull out the heat sink (P0015984))

In various embodiments, augmented reality content generator component 122 enables offline content authoring. For example, a content author wants to generate an AR experience that guides a Field Technician to replace a heat sink in a Power machine. In this particular example, instructions would already be extracted from the KM, and the underlying cognitive system would know which hardware item the instructions are referencing (and therefore associate the annotation with the proper object) and where that hardware item lies in the scene (therefore where to display the annotation). The content author would then just have to assemble the extracted instructions. In various embodiments, augmented reality content generator component 122 enables offline content authoring to generate real-time instructions. In other embodiments, augmented reality content generator component 122 enables a user to edit and/or author content while offline and/or in real-time.

Figure 2:
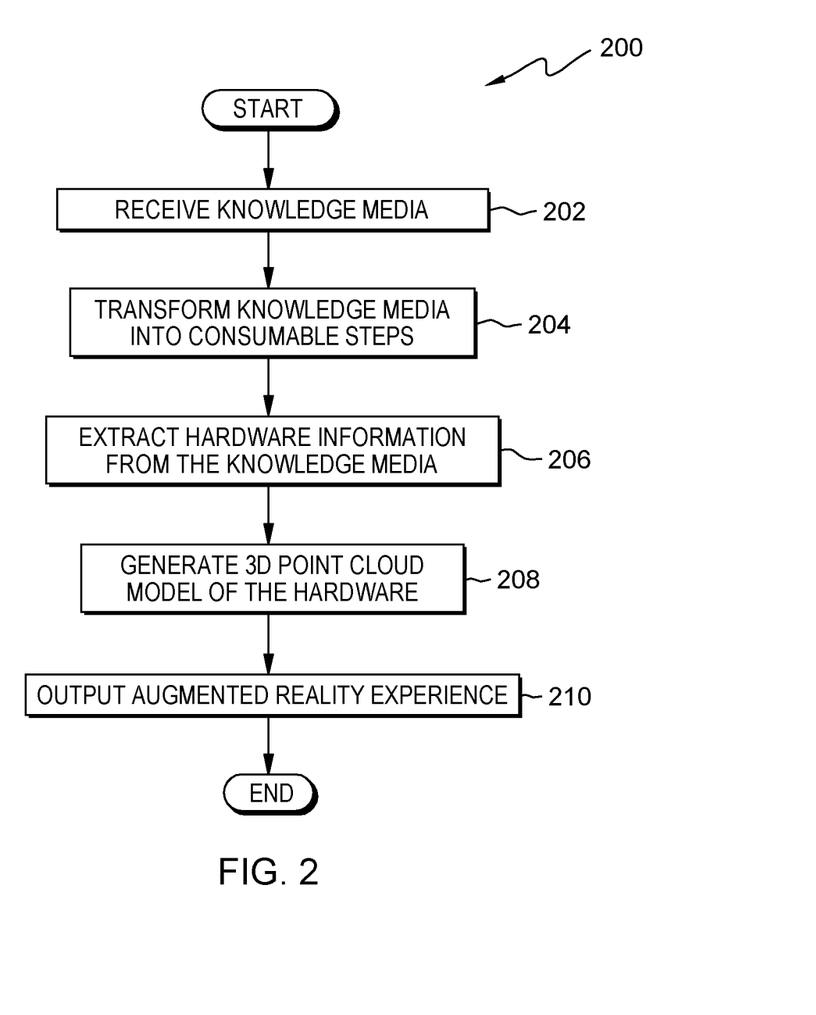
FIG. 2 illustrates operational steps of augmented reality content generator component, on a client device within the distributed data processing environment of FIG. 1, in accordance with an embodiment of the present invention.

FIG. 2 is a flowchart depicting operational steps of augmented reality content generator component 122, on server computer 120 within distributed data processing environment 100 of FIG. 1, in accordance with an embodiment of the present invention. It should be appreciated that FIG. 2 provides only an illustration of one implementation and does not imply any limitations with regard to the environments in which different embodiments can be implemented. Many modifications to the depicted environment can be made.

In step 202 augmented reality content generator component 122 receives KM. In various embodiments, augmented reality content generator component 122 can receive one or more KM.

In step 204, augmented reality content generator component 122 transforms KM into consumable steps. In various embodiments, augmented reality content generator component 122 can transform one or more KM into consumable steps for users.

In step 206, augmented reality content generator component 122 extracts hardware information from the received KM. In various embodiments, augmented reality content generator component 122, utilizing natural language processing (NLP), can mine and extract hardware entities (e.g., hardware shapes, information, location, and/or identification), and/or part numbers from KM. In various embodiments, augmented reality content generator component 122 can recover and utilize previously received KM and/or previously generated steps from local storage 108 and/or shared storage 124 to extract hardware information. Additionally, in various embodiments, augmented reality content generator component 122 can mine and extract information from third part databases and/or search engines on the internet. In other embodiments, augmented reality content generator component 122 can recognize hardware entities from received videos (e.g., KM) of hardware.

In step 208, augmented reality content generator component 122 generates a 3D point cloud model of the hardware. In various embodiments, augmented reality content generator component 122 can generate one or more 3D point cloud models utilizing the received one or more KM (e.g., videos of hardware entities and/or hardware repair). In various embodiments, augmented reality content generator component 122 can associate hardware entities with pixels in displayed AR videos. In various embodiments, augmented reality content generator component 122 can automatically generate the AR experience to a predetermined device. In various embodiments, augmented reality content generator component 122 can be trained to recognize objects (e.g., hardware entities). Additionally, in various embodiments, augmented reality content generator component 122 can create one or more labels (e.g., annotations) for the recognized hardware entities.

In step 210, augmented reality content generator component 122 outputs an augmented reality experience. In various embodiments, augmented reality content generator component 122 can output an augmented reality experience based on received one or more KM. In various embodiments, augmented reality content generator component 122 can display the generated 3D point cloud model in an AR environment and can provide an instructional video through at least AR glasses and/or a smartphone. In various embodiments, augmented reality content generator component 122 can retrieve information from previously generated augmented reality experiences from local storage 108 and/or shared storage 124. In various embodiments, augmented reality content generator component 122 can generate and display an augmented reality experience based on the generated 3D point cloud, the generated consumable steps, and the relevant 3D augmentations associated with the consumable steps. In various embodiments, the steps output by augmented reality content generator component 122 are constantly monitored and updated. In some embodiments, augmented reality content generator component 122 can learn and/or adjust to the user's experience and adapt the language of the steps to fit the user's level of understanding. For example, if the user is a highly experienced, augmented reality content generator component 122 can use more complex and professional terms, and generate repair steps with broad details and little description. Whereas, if the user is a novice then augmented reality content generator component 122 can provide very detailed and specific instructions. In various embodiments, augmented reality content generator component 122 can automatically output the AR experience to a predetermined device.

Figure 3:
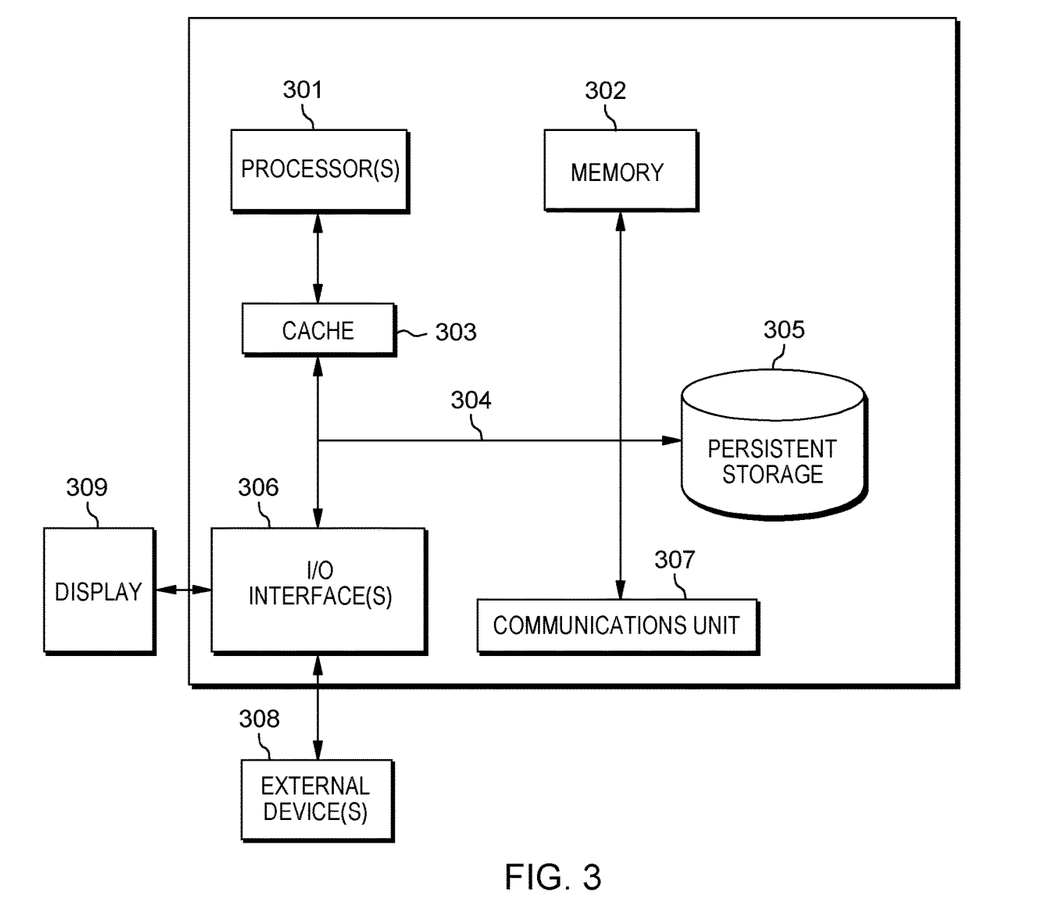
FIG. 3 depicts a block diagram of components of the server computer executing the calibration component within the distributed data processing environment of FIG. 1, in accordance with an embodiment of the present invention.

FIG. 3 depicts a block diagram of components of a computing device within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

FIG. 3 depicts computer system 300, where server computer 120 represents an example of computer system 300 that includes augmented reality content generator component 122. The computer system includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications, and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 enables for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

What is claimed is:

1. A method for generating an augmented reality experience based on Knowledge Media, the method comprising:
    receiving, by one or more processors, one or more Knowledge Media;
    transforming, by the one or more processors, the one or more Knowledge Media into consumable steps, wherein the consumable steps are enabled for real-time editing and offline content authoring;

extracting, by the one or more processors, hardware information from the one or more Knowledge Media, wherein extracting the hardware information comprises:
    extracting, by a natural language processor, one or more part numbers of one or more hardware entities; and
    searching, by the one or more processors, the one or more part numbers of the one or more hardware entities, wherein hardware information is mined and extracted from third party databases and internet search engines;
generating, by the one or more processors, a three-dimensional point cloud model of the one or more hardware entities with the taxonomy of the parts associated with the one or more hardware entities based on the extracted hardware information from the one or more Knowledge Media; and
outputting, by the one or more processors, the augmented reality experience based on the three-dimensional point cloud model.

2. The method of claim 1, wherein the method further comprises:
    displaying, the one or more processors, the augmented reality experience.

3. The method of claim 2, wherein the displaying further comprises:
    associating, by the one or more processors, the hardware with pixels in a video, wherein the association enables a user to interact with the associated hardware through the augmented reality, wherein the interaction is based on the consumable steps.

4. The method of claim 1, extracting hardware information further comprises:
    retrieving, by the one or more processors, hardware information from at least one of previously transformed consumable steps, or Knowledge Media from shared storage.

5. The method of claim 1, wherein outputting an augmented reality experience further comprises:
    annotating, by the one or more processes, the hardware based on the one or more Knowledge Media, wherein annotation comprises labeling hardware with at least one of: arrows, markers, labels, color, voice, sound, vibration, tunnel vision, text bubbles, or pulsing color.

6. The method of claim 1, wherein the augmented reality experience is automatically output to a predetermined device.

7. The method of claim 1, wherein the one or more Knowledge Media comprise at least one of: static documents, dynamic documents, active documents, live documents, rich text documents, plain text documents, or video documents.

8. A computer program product for generating an augmented reality experience based on Knowledge Media, the computer program product comprising:
one or more computer readable storage devices, wherein the one or more computer readable storage devices is non-transitory, and program instructions stored on the one or more computer readable storage devices, the stored program instructions comprising:
    program instructions to receive one or more Knowledge Media;
    program instructions to transform the one or more Knowledge Media into consumable steps, wherein the consumable steps are enabled for real-time editing and offline content authoring;
    program instructions to extract hardware information from the one or more Knowledge Media, wherein extracting the hardware information comprises:
        program instructions to extract, by a natural language processor, one or more part numbers of one or more hardware entities; and
        program instructions to search the one or more part numbers of the one or more hardware entities, wherein hardware information is mined and extracted from third party databases and internet search engines;
    program instructions to generate a three-dimensional point cloud model of the one or more hardware entities with the taxonomy of the parts associated with the one or more hardware entities based on the extracted hardware information from the one or more Knowledge Media; and
    program instructions to output an augmented reality experience based on the three-dimensional point cloud model.

9. The computer product of claim 8, wherein the computer product further comprises:
    program instructions to display the augmented reality experience.

10. The computer product of claim 9, wherein the displaying further comprises:
    program instructions to associate the hardware with pixels in a video, wherein the association enables a user to interact with the hardware through the augmented reality, wherein the interaction is based on the consumable steps.

11. The computer product of claim 8, extracting hardware information further comprises:
    program instructions to retrieve hardware information from at least one of previously transformed consumable steps, or Knowledge Media from shared storage.

12. The computer product of claim 8, wherein outputting an augmented reality experience further comprises annotating the hardware based on the one or more Knowledge Media, wherein annotation comprises labeling hardware with at least one of: arrows, markers, labels, color, voice, sound, vibration, tunnel vision, text bubbles, or pulsing color.

13. The computer product of claim 8, wherein the augmented reality experience is automatically output to a predetermined device.

14. The computer product of claim 8, wherein the one or more Knowledge Media comprise at least one of: static documents, dynamic documents, active documents, live documents, rich text documents, plain text documents, or video documents.

15. A computer system for generating an augmented reality experience based on Knowledge Media, the computer system comprising:
one or more computer processors;
one or more computer readable storage devices;
program instructions stored on the one or more computer readable storage devices for execution by at least one of the one or more computer processors, the stored program instructions comprising:
    program instructions to receive one or more Knowledge Media;
    program instructions to transform the one or more Knowledge Media into consumable steps, wherein the consumable steps are enabled for real-time editing and offline content authoring;

program instructions to extract hardware information from the one or more Knowledge Media, wherein extracting the hardware information comprises:
  program instructions to extract, by a natural language processor, one or more part numbers of one or more hardware entities; and
  program instructions to search the one or more part numbers of the one or more hardware entities, wherein hardware information is mined and extracted from third party databases and internet search engines;
program instructions to generate a three-dimensional point cloud model of the one or more hardware entities with the taxonomy of the parts associated with the one or more hardware entities based on the extracted hardware information from the one or more Knowledge Media; and
program instructions to output an augmented reality experience based on the three-dimensional point cloud model.

16. The computer system of claim 15, wherein the computer system further comprises:
program instructions to display the augmented reality experience.

17. The computer system of claim 16, wherein the displaying further comprises:
program instructions to associate the hardware with pixels in a video, wherein the association enables a user to interact with the associated hardware through augmented reality, wherein the interaction is based on the consumable steps.

18. The computer system of claim 15, extracting hardware information further comprises:
program instructions to retrieve hardware information from at least one of previously transformed consumable steps, or Knowledge Media from shared storage.

19. The computer system of claim 15, wherein outputting the augmented reality experience further comprises annotating the hardware based on the one or more Knowledge Media, wherein annotation comprises labeling hardware with at least one of: arrows, markers, labels, color, voice, sound, vibration, tunnel vision, text bubbles, or pulsing color.

20. The computer system of claim 15, wherein the one or more Knowledge Media comprise at least one of: static documents, dynamic documents, active documents, live documents, rich text documents, plain text documents, or video documents.

* * * * *